(12) United States Patent
Fukuta et al.

(10) Patent No.: US 9,763,075 B2
(45) Date of Patent: Sep. 12, 2017

(54) MOBILE COMMUNICATION SYSTEM, USER TERMINAL, AND BASE STATION SETTING A FREQUENCY FOR CELL RESELECTION

(71) Applicant: KYOCERA CORPORATION, Kyoto (JP)

(72) Inventors: Noriyoshi Fukuta, Yokohama (JP); Masato Fujishiro, Yokohama (JP); Hiroyuki Adachi, Kawasaki (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/082,949

(22) Filed: Mar. 28, 2016

(65) Prior Publication Data

US 2016/0212665 A1    Jul. 21, 2016

Related U.S. Application Data

(63) Continuation of application No. PCT/JP2014/081218, filed on Nov. 26, 2014.

(Continued)

(30) Foreign Application Priority Data

Nov. 26, 2013    (JP) .................................. 2013-244257

(51) Int. Cl.
*H04L 29/08*    (2006.01)
*H04W 8/00*    (2009.01)
(Continued)

(52) U.S. Cl.
CPC ....... *H04W 8/005* (2013.01); *H04L 29/08306* (2013.01); *H04L 67/104* (2013.01);
(Continued)

(58) Field of Classification Search
CPC ................ H04W 76/046; H04W 4/005; H04L 29/08306; H04L 67/104
See application file for complete search history.

(56) References Cited

U.S. PATENT DOCUMENTS

2011/0143712 A1    6/2011    Christensson et al.
2011/0170481 A1    7/2011    Gomes et al.
(Continued)

FOREIGN PATENT DOCUMENTS

| JP | 2013-513993 A | 4/2013 |
| JP | 2013-516930 A | 5/2013 |
| JP | 2013-223192 A | 10/2013 |

OTHER PUBLICATIONS

3GPP, "TS 36.331 v.9.12.0", Nov. 2012, pp. 1-261.*
(Continued)

*Primary Examiner* — Andrew Chriss
*Assistant Examiner* — Salvador E Rivas
(74) *Attorney, Agent, or Firm* — Studebaker & Brackett PC

(57) ABSTRACT

A user terminal includes a controller configured to: camp on a first cell on a first frequency, in a Radio Resource Control (RRC) idle mode; find a second cell on a second frequency available for Device-to-Device (D2D) communication in response to the user terminal having an interest in the D2D communication; designate the second frequency as a highest priority frequency of cell reselection, for reselection to the second cell; and designate the second frequency as the highest priority frequency while camping on the second frequency.

1 Claim, 8 Drawing Sheets

Related U.S. Application Data

(60) Provisional application No. 62/056,064, filed on Sep. 26, 2014.

(51) Int. Cl.
| | | |
|---|---|---|
| *H04W 4/00* | (2009.01) | |
| *H04W 48/12* | (2009.01) | |
| *H04W 52/02* | (2009.01) | |
| *H04W 36/08* | (2009.01) | |
| *H04W 76/02* | (2009.01) | |
| *H04W 76/04* | (2009.01) | |

(52) U.S. Cl.
CPC ........... *H04W 4/005* (2013.01); *H04W 4/008* (2013.01); *H04W 36/08* (2013.01); *H04W 48/12* (2013.01); *H04W 52/0216* (2013.01); *H04W 52/0219* (2013.01); *H04W 52/0229* (2013.01); *H04W 76/022* (2013.01); *H04W 76/023* (2013.01); *H04W 76/043* (2013.01); *Y02B 60/50* (2013.01)

(56) References Cited

U.S. PATENT DOCUMENTS

| | | | |
|---|---|---|---|
| 2013/0288668 A1 | 10/2013 | Pragada et al. | |
| 2014/0187283 A1* | 7/2014 | Nimbalker | H04W 72/048 455/550.1 |
| 2014/0295868 A1* | 10/2014 | Lee | H04W 4/023 455/452.1 |
| 2015/0087283 A1 | 3/2015 | Isobe et al. | |
| 2015/0173115 A1* | 6/2015 | Van Phan | H04W 76/023 455/404.2 |
| 2015/0250011 A1* | 9/2015 | Lindoff | H04W 76/023 370/225 |
| 2016/0044552 A1* | 2/2016 | Heo | H04W 76/023 370/331 |
| 2016/0073335 A1* | 3/2016 | Liao | H04W 48/18 370/329 |

OTHER PUBLICATIONS

International Search Report issued in PCT/JP2014/081218; mailed Mar. 3, 2015.

Written Opinion issued in PCT/JP2014/081218; mailed Mar. 3, 2015.

3rd Generation Partnership Project; Technical Specification Group Services and System Aspects; Feasibility study for Proximity Services (ProSe); 3GPP TR 22.803; V12.2.0; Jun. 2013; pp. 1-45; Release 12; 3GPP Organizational Partners.

Catt; D2D communication solutions; 3GPP TSG RAN WG2 Meeting #83; R2-132534; Aug. 18-23, 2013; pp. 1-7; Barcelona, Spain.

Ericsson; Mobility for D2D UEs; 3GPP TSG-RAN WG3 #82; R3-132277; Nov. 11-15, 2013; pp. 1-5; San Francisco, USA.

An Office Action issued by the Japanese Patent Office on Mar. 14, 2017, which corresponds to Japanese Patent Application No. 2017-011901 and is related to U.S. Appl. No. 15/082,949; with English language Concise Explanation.

3GPP TSG-SA WG2 #95, S2-130358, "Consideration of isolated access ProSe scenarios", Prague, Czech Republic, Jan. 26-30, 2013.

Huawei et al.; "RRC Procedures for ProSe Discovery", 3GPP TSG-RAN WG2 Meeting #84; R2-134402; Nov. 11-15, 2013; 10pp.; San Fransico, U.S.

Kyocera; "Inter-frequency discovery considerations"; 3GPP TSG-RAN WG2 #86; R2-142240; May 19-23, 2014; 10pp.; Seoul, South Korea.

The extended European search report issued by the European Patent Office dated May 31, 2017, which corresponds to European Patent Application No. 14865233.2-1875 and is related to U.S. Appl. No. 15/082,949.

\* cited by examiner

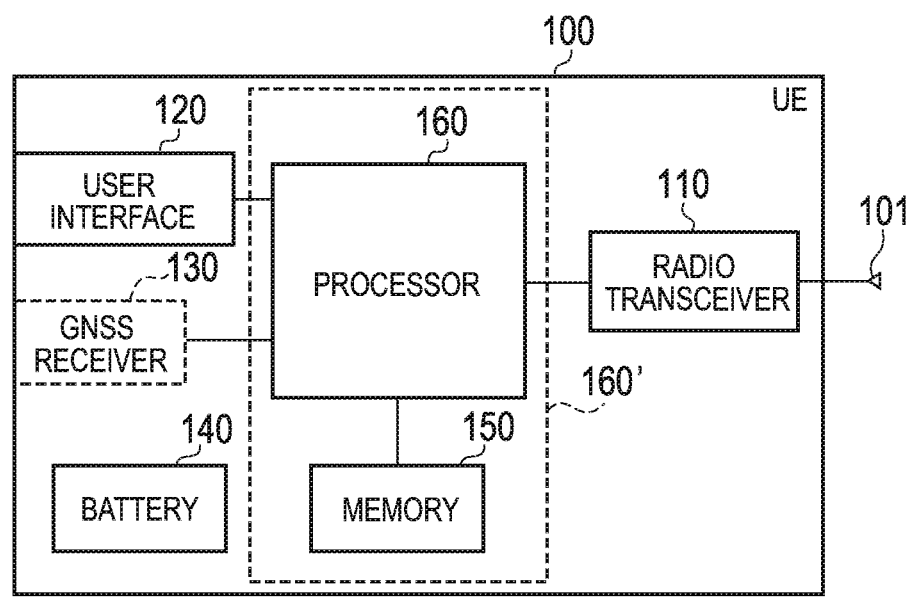
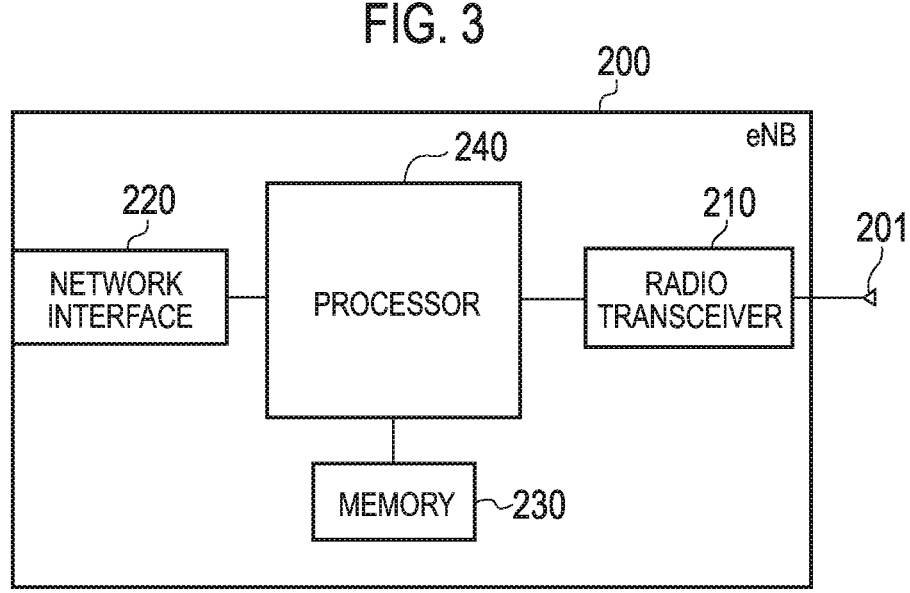

US 9,763,075 B2

MOBILE COMMUNICATION SYSTEM, USER TERMINAL, AND BASE STATION SETTING A FREQUENCY FOR CELL RESELECTION

RELATED APPLICATIONS

This application is a continuation application of international application PCT/JP2014/081218, filed Nov. 26, 2014, which claims benefit of Japanese Patent Application No. 2013-244257, filed Nov. 26, 2013, and U.S. Provisional Application No. 62/056,064, filed on Sep. 26, 2014, the entirety of applications hereby expressly incorporated by reference.

TECHNICAL FIELD

The present disclosure relates to a mobile communication system to which D2D communication is introduced.

BACKGROUND

In 3GPP (3rd Generation Partnership Project) which is a project aiming to standardize a mobile communication system, the introduction of Device-to-Device (D2D) communication is discussed as a new function on and after Release 12 (see Non Patent Document 1).

In the D2D communication, in a terminal group configured by a plurality of adjacent user terminals, direct Device-to-Device communication is performed without passing through a network. On the other hand, in cellular communication which is normal communication in a mobile communication system, user terminals make communication through a network.

In the D2D communication, since radio communication with low transmission power can be performed between adjacent user terminals, a power consumption of the user terminals and a load on the network can be reduced in comparison with the cellular communication.

PRIOR ART DOCUMENTS

Non Patent Document

[Non Patent Document 1] 3GPP technical report "TR 22.803 V12.2.0" June, 2013

SUMMARY

A mobile communication system according to a first aspect includes a base station configured to transmit system information on at least one D2D available cell in which D2D communication is available; and a user terminal that exists in a cell of the base station, and configured to receive the system information from the base station. The system information includes frequency information that indicates a frequency to which the D2D available cell belongs.

A user terminal according to a second aspect includes a receiver configured to receive, from a base station, system information on at least one D2D available cell in which D2D communication is available. The system information includes frequency information that indicates a frequency to which the D2D available cell belongs.

A user terminal according to a third aspect is a connected state in a cell managed by a base station. The user terminal includes a controller configured to transmit, to the base station, a D2D interest notification that indicates that the user terminal has an interest in D2D communication, when the user terminal has an interest in the D2D communication.

A base station according to a fourth aspect includes a transmitter configured to transmit system information on at least one D2D available cell in which D2D communication is available. The system information includes frequency information that indicates a frequency to which the D2D available cell belongs.

BRIEF DESCRIPTION OF DRAWINGS

FIG. 2 is a block diagram of UE according to the embodiments.
FIG. 3 is a block diagram of eNB according to the embodiments.

DETAILED DESCRIPTION

[Overview of Embodiments]

Figure 1:
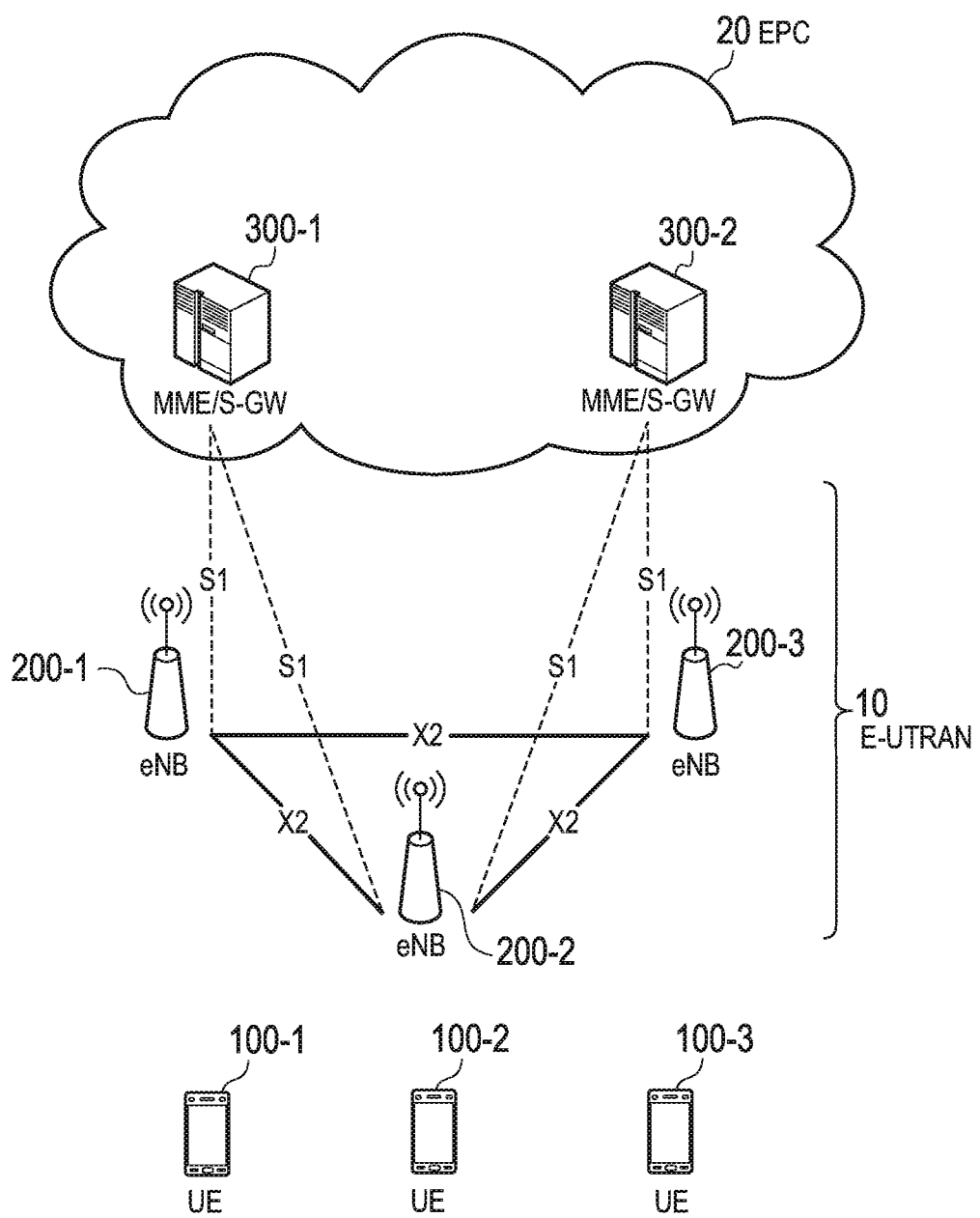
FIG. 1 is a configuration diagram of an LTE system according to embodiments.

The D2D communication may not be available in all the cells in the mobile communication system. That is, a D2D available cell in which D2D communication is available and a D2D unavailable cell in which the D2D communication is unavailable may be mixed.

Therefore, there is a problem that a user terminal supporting the D2D communication is not capable of using the D2D communication in a period during which the user terminal exists in the D2D unavailable cell even when the user terminal has an interest in the D2D communication (that is, when the user terminal intends to perform D2D communication).

Thus, an object of the present disclosure is to improve the availability of the D2D communication.

A mobile communication system according to an embodiments includes at least one D2D available cell in which D2D communication is available and at least one D2D unavailable cell in which the D2D communication is unavailable. The D2D unavailable cell transmits a D2D availability notification about the D2D available cell. A user terminal existing in the D2D unavailable cell receives the D2D availability notification from the D2D unavailable cell. The D2D availability notification includes frequency information indicating a frequency to which the D2D available cell belongs.

In the embodiments, the D2D available cell is any one of: a cell that belongs to a frequency supporting the D2D communication; a cell that complies with a radio access technology supporting the D2D communication; and a cell in which cellular communication is disabled due to fault occurrence.

In the embodiments, the D2D unavailable cell is any one of: a cell that belongs to a frequency not supporting the D2D communication; a cell that complies with a radio access technology not supporting the D2D communication; and a cell in which the D2D communication is supported but use of the D2D communication is prohibited.

In the embodiments, the D2D unavailable cell is managed by a first base station. The D2D available cell is managed by the first base station and/or managed by a second base station adjacent to the first base station.

In the embodiments, the D2D available cell is managed by the second base station, the first base station acquires information to be included in the D2D availability notification from the second base station or an upper network entity.

In the embodiments, the D2D availability notification includes at least one of: cell information indicating the D2D available cell; base station information indicating a base station managing the D2D available cell; radio access technology information indicating a radio access technology with which the D2D available cell complies; and capability related information indicating whether or not a capability is needed to perform the D2D communication without control of a base station in the D2D available cell.

In the embodiments, when the capability is needed to perform the D2D communication without control of a base station in the D2D available cell, the D2D availability notification includes information indicating a maximum transmission power available for the D2D communication in the D2D available cell.

In the embodiments, the user terminal is in an idle state and selects, as a serving cell, the D2D unavailable cell. The user terminal receiving the D2D availability notification sets, when the user terminal has an interest in the D2D communication and has a capability to perform the D2D communication at the frequency to which the D2D available cell belongs, a frequency to which the D2D available cell belongs, to the highest priority, as a priority for reselecting the serving cell.

In the embodiments, the user terminal includes a function of setting a frequency at which MBMS is provided, to the highest priority, as the priority for selecting the serving cell. The user terminal receiving the D2D availability notification selects, when the frequency to which the D2D available cell belongs is different from the frequency at which the MBMS is provided, a frequency set to the highest priority on the basis of whether the user terminal has an interest in either one of the D2D communication or the MBMS.

In the embodiments, the mobile communication further comprises a second user terminal that is in an idle state and selects, as a serving cell, the D2D available cell. The second user terminal sets, when the second user terminal has an interest in the D2D communication or performs the D2D communication, a frequency to which the D2D available cell belongs, to the highest priority, as the priority for reselecting the serving cell.

In the embodiments, the user terminal is in a connected state and establishes a connection with the D2D unavailable cell. When the user terminal receiving the D2D availability notification has an interest in the D2D communication and has a capability to perform the D2D communication at the frequency to which the D2D available cell belongs, the user terminal transmits, to the D2D unavailable cell, a D2D interest notification indicating that the user terminal has the interest in the D2D communication.

In the embodiments, the user terminal is prohibited from transmitting the D2D interest notification to a cell not supporting the transmission of the D2D availability notification.

In the embodiments, the D2D unavailable cell receiving the D2D interest notification attempts to perform handover of the user terminal to the D2D available cell from the D2D unavailable cell.

In the embodiments, the D2D interest notification includes information indicating a frequency for the D2D communication intended by the user terminal for use and information indicating whether or not the user terminal prioritizes the D2D communication over cellular communication.

A user terminal according to embodiments exists in a D2D unavailable cell in a mobile communication system including at least one D2D available cell in which D2D communication that is direct terminal-to-terminal communication is available and at least one D2D unavailable cell in which the D2D communication is unavailable. The user terminal comprises a receiver that receives a D2D availability notification about the D2D available cell from the D2D unavailable cell. The D2D availability notification includes frequency information indicating a frequency to which the D2D available cell belongs.

A base station according to an embodiments manages a D2D unavailable cell in a mobile communication system including at least one D2D available cell in which D2D communication that is direct terminal-to-terminal communication is available and at least one D2D unavailable cell in which the D2D communication is unavailable. The base station comprises a transmitter that transmits a D2D availability notification about the D2D available cell to a user terminal existing in the D2D unavailable cell. The D2D availability notification includes frequency information indicating a frequency to which the D2D available cell belongs.

[Embodiments]

Hereinafter, an embodiment for applying the present disclosure to an LTE system is explained.

(System Architecture)

FIG. 1 is a architecture diagram of the LTE system according to the embodiment. As shown in FIG. 1, the LTE system according to the embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell) with which a connection is established. The architecture of the UE 100 will be described later.

The E-UTRAN 10 corresponds to a radio access network. The E-UTRAN 10 includes eNB 200 (evolved Node-B). The eNB 200 corresponds to a base station. The eNBs 200 are connected mutually via an X2 interface. The architecture of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. A network of the LTE system is configured by the E-UTRAN 10 and the EPC 20. The EPC 20 includes MME (Mobility Management Entity)/S-GW (Serving-Gateway) 300. The MME performs different types of mobility control and the like for the UE 100. The SGW performs transfer control of the user data. The MME/S-GW 300 is connected to the eNB 200 via an S1 interface.

FIG. 2 is a block diagram of the UE 100. As shown in FIG. 2, the UE 100 includes an antenna 101, a radio transceiver 110, a user interface 120, a GNSS (Global Navigation Satellite System) receiver 130, a battery 140, a memory 150, and a processor 160. The memory 150 and the processor 160 configure a controller. The UE 100 may not necessarily include the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, various buttons and the like. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various processes by executing the program stored in the memory 150. The processor 160 may further include a codec that performs encoding and decoding on sound and video signals. The processor 160 executes various processes and various communication protocols described later.

FIG. 3 is a block diagram of the eNB 200. As shown in FIG. 3, the eNB 200 includes an antenna 201, a radio transceiver 210, a network interface 220, a memory 230, and a processor 240. The memory 230 and the processor 240 configure a controller.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various processes by executing the program stored in the memory 230. The processor 240 executes various processes and various communication protocols described later.

Figure 4:
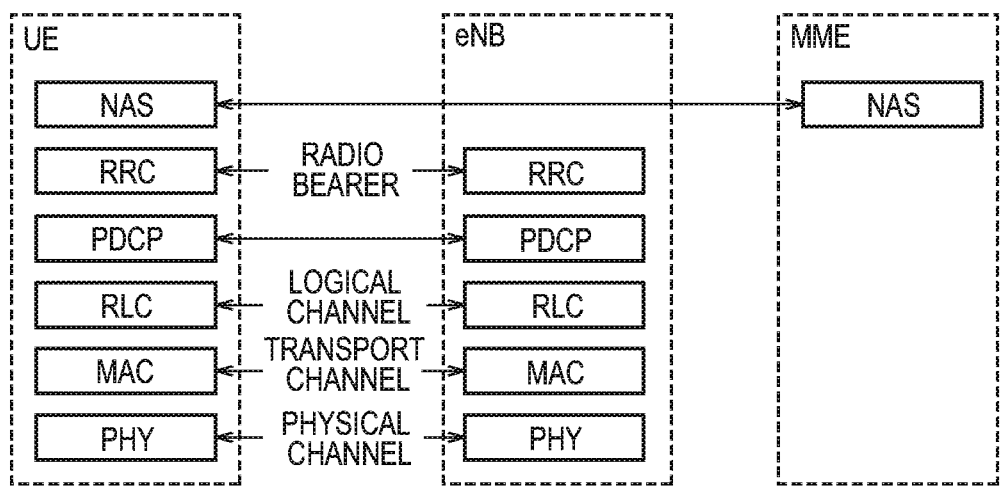
FIG. 4 is a protocol stack diagram of a radio interface according to the embodiments.

FIG. 4 is a protocol stack diagram of a radio interface in the LTE system. As shown in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, and a retransmission process and the like by a hybrid ARQ (HARQ). Between the MAC layer of the UE 100 and the MAC layer of the eNB 200, user data and control signals are transmitted via a transport channel. The MAC layer of the eNB 200 includes a scheduler for determining (scheduling) a transport format (a transport block size and a modulation and coding scheme) of an uplink and a downlink, and resource blocks to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of configurations is transmitted. The RRC layer controls the logical channel, the transport channel, and the physical channel according to the establishment, re-establishment, and release of a radio bearer. When there is a connection (an RRC connection) between the RRC of the UE 100 and the RRC of the eNB 200, the UE 100 is in a connected state (an RRC connected state). Otherwise, the UE 100 is in an idle state (an RRC idle state).

An NAS (Non-Access Stratum) layer positioned above the RRC layer performs session management, mobility management and the like.

Figure 5:
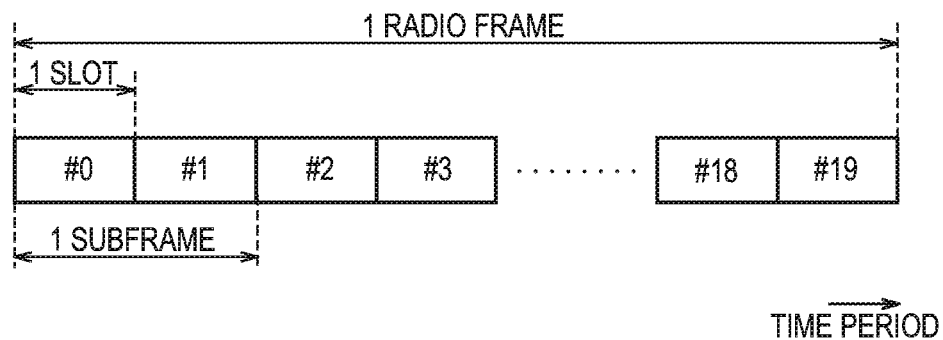
FIG. 5 is a configuration diagram of a radio frame according to the embodiments.

FIG. 5 is a configuration diagram of a radio frame used in the LTE system. In the LTE system, OFDMA (Orthogonal Frequency Division Multiple Access) is applied to a downlink (DL), and SC-FDMA (Single Carrier Frequency Division Multiple Access) is applied to an uplink (UL), respectively.

As shown in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each of the resource blocks includes a plurality of subcarriers in the frequency direction. A resource element is configured by one subcarrier and one symbol.

Among the radio resources assigned to the UE 100, a frequency resource is configured by a resource block, and a time resource is configured by a subframe (or a slot).

In the downlink, an interval of several symbols at the head of each subframe is a region used as a physical downlink control channel (PDCCH) for mainly transmitting a downlink control signal. Furthermore, the remaining portion of each subframe is a region available as a physical downlink shared channel (PDSCH) for mainly transmitting downlink user data.

In the uplink, both ends in the frequency direction of each subframe are regions used as a physical uplink control channel (PUCCH) for mainly transmitting an uplink control signal. The remaining portion of each subframe is a region available as a physical uplink shared channel (PUSCH) for mainly transmitting uplink user data.

(D2D Communication)

Figure 6:
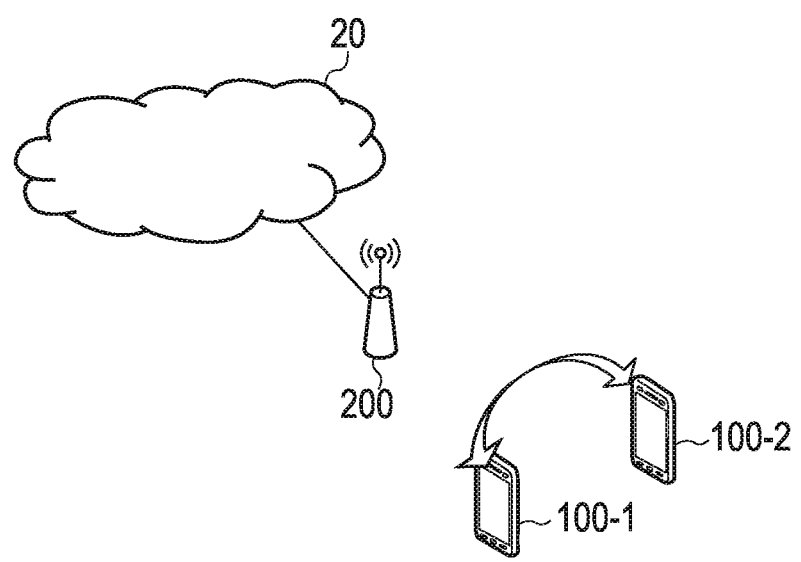
FIG. 6 is a diagram illustrating D2D communication according to the embodiments.

The LTE system according to the embodiment supports D2D communication that is direct Device-to-Device communication (inter-UE communication). FIG. 6 is a diagram illustrating D2D communication according to the embodiment.

Hereinafter, the D2D communication will be described in comparison with cellular communication that is normal communication of the LTE system. The cellular communication is a communication mode in which a data path is made through a network (E-UTRAN10, EPC20). The data path is a transmission path for user data.

In contrast to this, as shown in FIG. 6, the D2D communication is a communication mode in which a data path set between UEs is made without a network. A plurality of UEs 100 (UE 100-1 and UE 100-2) adjacent to each other directly perform radio communication with low transmission power. A frequency of the D2D communication may be shared with a frequency of the cellular communication, or may be different from the frequency of the cellular communication. The D2D communication may include a neighborhood discovery procedure (Discovery procedure). In the Discovery procedure, synchronization with a neighbor UE is established, and then, the neighbor UE is identified (discovered). The D2D communication may be called as D2D proximity service (D2D ProSe).

A group of UEs performing the D2D communication may be called a cluster. A case in which all the UEs 100 forming the cluster are located within the cell coverage is called "In coverage". A case in which all the UEs 100 forming the cluster are located outside the cell coverage is called "Out of coverage". A case in which some UEs 100 in the cluster are located within the cell coverage and the remaining UEs 100 are located outside the cell coverage is called "Partial coverage".

In this manner, in the D2D communication, the plurality of UEs 100 in the cluster directly perform radio communication with low transmission power to make it possible to reduce a power consumption of the UE 100 and to reduce interference to a neighboring cell in comparison with the cellular communication.

(Operation According to Embodiment)

Hereinafter, an operation according to the embodiment will be described.

(1) Operation Overview

The D2D communication may not be available in all the cells. That is, a cell in which D2D communication is available (D2D available cell) and a cell in which the D2D communication is unavailable (D2D unavailable cell) may be mixed.

Therefore, a user terminal supporting the D2D communication is not capable of using the D2D communication in a period during which the user terminal exists in the D2D unavailable cell even when the user terminal has an interest in the D2D communication (that is, when the user terminal intends to perform D2D communication).

Thus, in the embodiment, the D2D unavailable cell transmits a D2D availability notification about the D2D available cell. It is preferred that the D2D available cell is a cell (neighboring cell) having at least a part of cell coverage overlapping the D2D unavailable cell.

The D2D availability notification includes frequency information indicating a frequency to which the D2D available cell belongs. The UE 100 existing in the D2D unavailable cell receives the D2D availability notification from the D2D unavailable cell. It is noted that "existing" in the embodiment may indicate that the UE 100 is in either state, a connected state or an idle state.

Thus, the UE 100 existing in the D2D unavailable cell receives the D2D availability notification to thereby comprehend a frequency to which the D2D available cell belongs, i.e., a frequency at which the D2D communication is available.

Further, the D2D available cell transmits a D2D availability notification about the D2D available cell. The UE 100 existing in the D2D available cell receives the D2D availability notification from the D2D available cell.

As a result, the UE 100 existing in the D2D available cell becomes capable of comprehending that the D2D communication is available in a existing cell (serving cell), on the basis of the D2D availability notification.

Figure 7A:
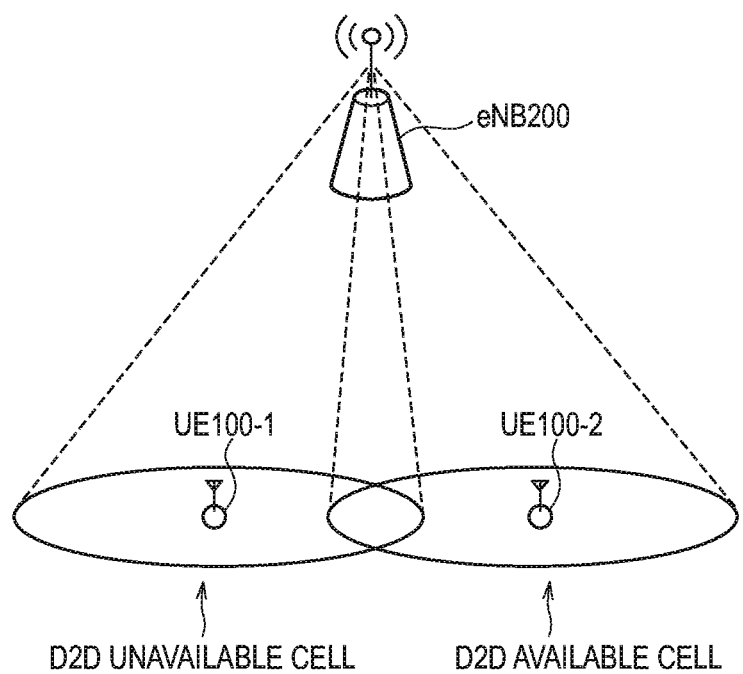
FIGS. 7A and 7B are diagrams illustrating a D2D available cell and a D2D unavailable cell according to the embodiments.
Figure 7B:
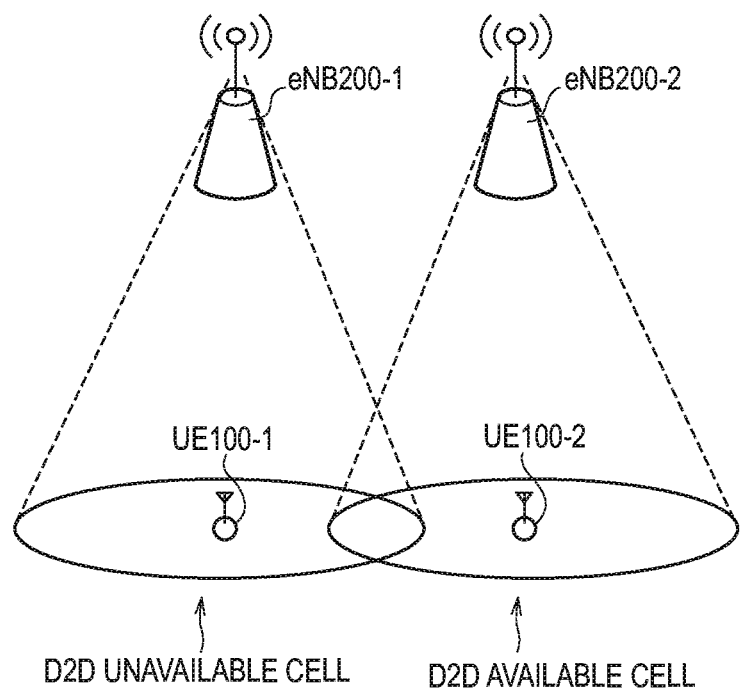

FIGS. 7A and 7B are diagrams illustrating the D2D available cell and the D2D unavailable cell. In FIGS. 7A and 7B, the D2D available cell and the D2D unavailable cell belong to a different frequency.

FIG. 7A shows an example where the D2D available cell and the D2D unavailable cell are managed by the same base station (eNB 200). FIG. 7B shows an example where the D2D available cell and the D2D unavailable cell are managed by different base stations (eNB 200-1 and eNB 200-2). On the D2D available cell, the UE 100-1 camps, and on the D2D unavailable cell, the UE 100-2 camps.

The D2D available cell is a cell belonging to a frequency supporting the D2D communication. On the other hand, the D2D unavailable cell is a cell belonging to a frequency not supporting the D2D communication. For example, when the D2D available cell belongs to a 2 GHz band and the D2D unavailable cell belongs to an 800 MHz band, a possible scenario would be that the 2 GHz band supports the D2D communication and the 800 MHz band does not support the D2D communication. The frequency supporting the D2D communication may be a dedicated band such as a frequency dedicated to Public Safety.

Alternatively, the D2D available cell is a cell that complies with a radio access technology supporting the D2D communication. On the other hand, the D2D unavailable cell is a cell that complies with a radio access technology not supporting the D2D communication. For example, when the D2D available cell complies with E-UTRAN (LTE) and the D2D unavailable cell complies with GERAN (GSM (registered trademark)), a possible scenario would be that the E-UTRAN (LTE) supports the D2D communication and the GERAN (GSM (registered trademark)) does not support the D2D communication.

Alternatively, in the D2D unavailable cell, the D2D communication is supported; however, the use of the D2D communication is prohibited. For example, when the both 2 GHz band and the 800 MHz band support the D2D communication, a possible scenario would be that the number of UEs performing the D2D communication is small and thus the D2D communication is permitted only in the 2 GHz band and the use of D2D is not permitted in the 800 MHz band.

Alternatively, the D2D available cell is a cell in which the cellular communication is disabled due to fault occurrence (hereinafter, referred to as "fault occurrence cell"). Thus, in the fault occurrence cell, the frequency of this cell is used also for the D2D communication and the D2D communication is enabled in a Public safety mode (Out of coverage and/or Partial Coverage).

(2) D2D Availability Notification

The D2D availability notification may include at least one of: cell information (cell ID) indicating the D2D available cell; eNB 200 information (eNB ID) indicating eNB 200 managing the D2D available cell; and radio access technology information indicating a radio access technology with which the D2D available cell complies. Thereby, the UE 100 is capable of more accurately comprehending the D2D available cell.

Further, the D2D availability notification may include capability related information indicating whether or not a capability is needed to perform the D2D communication without control of the eNB 200 in the D2D available cell. For example, in the D2D communication at a frequency dedicated to Public safety or in the Public safety mode (Out of coverage and/or Partial Coverage), a capability is needed to perform the D2D communication without control of the eNB 200. Thus, by the capability related information, whether or not a capability is needed to perform the D2D communication without control of the eNB 200 is notified.

When the capability is needed to perform the D2D communication without control of the eNB 200 in the D2D available cell, the D2D availability notification preferably includes information indicating a maximum transmission power available for the D2D communication in the D2D available cell. Thereby, even when the D2D communication is performed without control of the eNB 200, it is possible to prevent the D2D communication from being performed with excessive power.

In an operation environment shown in FIG. 7B, that is, in a case where the D2D available cell and the D2D unavailable cell are managed by different base stations (eNB 200-1 and eNB 200-2), it is necessary to share information between base stations.

In FIG. 7B, the eNB 200-1 managing the D2D unavailable cell acquires information to be included in the D2D availability notification from the eNB 200-2 managing the D2D available cell. That is, the eNB 200-2 notifies, on an X2 interface, the adjacent eNB 200-1 of the information on the D2D available cell, which is a cell managed by the eNB 200-2.

Alternatively, the eNB 200-1 managing the D2D unavailable cell may acquire information to be included in the D2D availability notification from an upper network entity on an S1 interface, rather than from the eNB 200-2. The upper network entity may be MME, for example.

Figure 8:
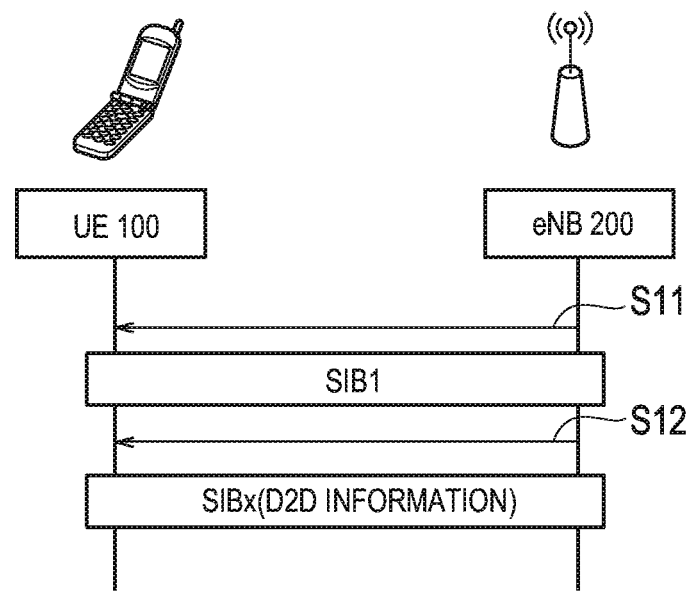
FIG. 8 is a diagram illustrating a method of transmitting a D2D availability notification according to the embodiments.

FIG. 8 is a diagram illustrating a method of transmitting the 2D availability notification from the eNB 200 to the UE 100. In this case, an example in which the D2D availability notification is included in SIB (System Information Block) that is system information to be broadcast will be described. The SIB including the D2D availability notification is expressed as "SIBx" where necessary.

As described in FIG. 8, in step S11, the eNB 200 transmits SIB1 (SIB Type 1) indicating a time region scheduling of each SIB after SIB2. Upon receipt of the SIB1, the UE 100 existing in the cell of the eNB 200 comprehends a timing at which the SIBx is assigned on the basis of the received SIB1.

In step S12, the eNB 200 transmits the SIBx in the assignment timing indicated by the SIB1. Upon receipt of the SIBx, the UE 100 existing in the cell of the eNB 200 comprehends the information on the D2D available cell on the basis of the received SIBx.

(3) Use Case of D2D Availability Notification

Next, a use case of the D2D availability notification will be described.

(3.1) Use Case 1

In a use case 1, a case is assumed where the UE 100 in an idle state in the D2D unavailable cell (UE 100-1 in FIGS. 7A and 7B) receives the D2D availability notification (SIBx).

The UE 100 is in an idle state and selects, as a serving cell, the D2D unavailable cell. The UE 100 receiving the D2D availability notification sets, when the UE 100 has an interest in the D2D communication and has a capability to perform the D2D communication at a frequency to which the D2D available cell belongs, the frequency to which the D2D available cell belongs, to the highest priority, as a priority for reselecting the serving cell.

An operation of reselecting the serving cell is called "cell reselection". In the cell reselection, on the basis of a ranking determined by comparison between a reception level of a camping cell (serving cell) and a reception level of a neighboring cell and a frequency priority (cellReselectionPriority), the serving cell is selected. Specifically, a cell belonging to a frequency having a higher priority is preferentially selected as the serving cell.

Therefore, when the UE 100 in an idle state that has an interest in the D2D communication sets, to the highest priority, the frequency to which the D2D available cell belongs, the UE 100 becomes easy to move to the D2D available cell. Accordingly, the UE 100 in an idle state that has an interest in the D2D communication is capable of moving to the D2D available cell to use the D2D communication.

It is noted that the UE 100 may be provided with a function of setting a frequency at which MBMS (Multimedia Broadcast and Multicast Service) is provided, to the highest priority, as the priority for selecting the serving cell. The UE 100 receiving the D2D availability notification may select, when the frequency to which the D2D available cell belongs is different from the frequency at which the MBMS is provided, the frequency set to the highest priority on the basis of whether the UE 100 has an interest in either one of the D2D communication or the MBMS.

(3.2) Use Case 2

In the use case 2, a case is assumed where the UE 100 in an idle state in the D2D available cell (UE 100-2 in FIGS. 7A and 7B) receives the D2D availability notification (SIBx).

The UE 100 is in an idle state and selects, as a serving cell, the D2D available cell. The UE 100 sets, when the UE 100 has an interest in the D2D communication or performs the D2D communication, the frequency to which the D2D available cell belongs, to the highest priority, as the priority for reselecting the serving cell.

As a result, when the UE 100 in an idle state that has an interest in the D2D communication or performs the D2D communication sets, to the highest priority, the frequency to which the D2D available cell belongs, the UE 100 becomes easy to remain in the D2D available cell. Accordingly, the UE 100 in an idle state that has an interest in the D2D communication continues to remain in the D2D available cell to thereby enable continuation of use of the D2D communication.

(3.3) Use Case 3

In the use case 3, a case is assumed where the UE 100 in a connected state in the D2D unavailable cell (UE 100-1 in FIGS. 7A and 7B) receives the D2D availability notification (SIBx).

Figure 9:
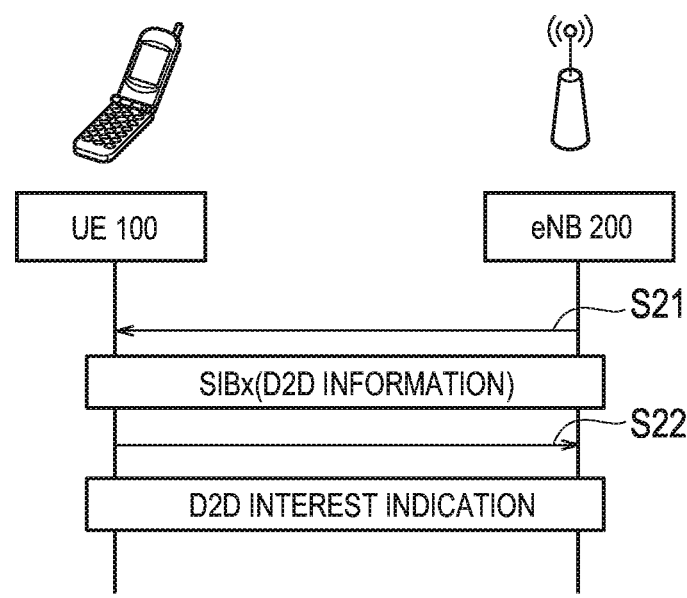
FIG. 9 is a diagram illustrating a use case 3 of the D2D availability notification according to the embodiments.

FIG. 9 is a diagram illustrating a use case 3 of the D2D availability notification. The UE 100 is in a connected state and establishes a connection with the D2D unavailable cell.

In step S21, the UE 100 receives the D2D availability notification (SIBx) from the eNB 200 (D2D unavailable cell).

In step S22, the UE 100 receiving the D2D availability notification transmits, when the UE 100 has an interest in the D2D communication and has a capability to perform the D2D communication at a frequency to which the D2D available cell belongs, a D2D interest notification indicating that the UE 100 has the interest in the D2D communication to the eNB 200 (D2D unavailable cell).

The eNB 200 receiving the D2D interest notification (D2D unavailable cell) attempts handover of the UE 100 from the D2D unavailable cell to the D2D available cell.

Thus, when the UE 100 in a connected state that has an interest in the D2D communication is handed over from the D2D unavailable cell to the D2D available cell, the UE 100 is moved to the D2D available cell to thereby enable use of the D2D communication.

The D2D interest notification includes information indicating a frequency for the D2D communication intended by the UE 100 and information indicating whether or not the UE 100 prioritizes the D2D communication over the cellular communication, for example. Thus, the eNB 200 (D2D unavailable cell) is capable of appropriately determining whether the UE 100 is handed over and determining a handover destination cell. It is noted that the D2D interest notification may include at least one of the information included in the D2D availability notification.

In the embodiment, the UE 100 is prohibited from transmitting the D2D interest notification to a cell not supporting the transmission of the D2D availability notification. That is, the UE 100 needs to receive the D2D availability notification from a serving cell to enable transmission of the D2D interest notification to the serving cell. As a result, it is possible to prevent transmission of an inappropriate D2D interest notification.

(Conclusion of Embodiment)

As described above, the D2D unavailable cell transmits the D2D availability notification about the D2D available cell. The D2D availability notification includes frequency information indicating a frequency to which the D2D available cell belongs. The UE 100 existing in the D2D unavailable cell receives the D2D availability notification from the D2D unavailable cell. As a result, the UE 100 existing in the D2D unavailable cell receives the D2D availability notification to thereby comprehend a frequency to which the D2D available cell belongs, i.e., a frequency at which the D2D communication is available. As a consequence, the UE 100 is capable of performing control for moving to the D2D available cell, and thus, it is possible to improve the availability of the D2D communication.

(First Modification)

In the above-described use cases 1 and 2, the UE 100 in an idle state controls the frequency priority in the cell reselection (cellReselectionPriority), on the basis of whether the UE 100 has an interest in the D2D communication.

Specifically, the UE 100 in an idle state sets, when the UE 100 has an interest in the D2D communication, the frequency to which the D2D available cell belongs, to the highest priority, as the priority for reselecting the serving cell.

It is noted that the UE 100 in an idle state may control the cell reselection in consideration of a content of SIB5 received from a network, in addition to the above-described SIBx (in this case, SIB18). Like the SIBx, the SIB5 is one of broadcast information, and is an information element defined by an RRC layer. The SIB5 includes information on an inter-frequency cell reselection. The information on the inter-frequency cell reselection includes a parameter for controlling a priority of the cell reselection. Examples of the parameter may include a frequency priority (cellReselectionPriority) and an offset value imparted to a reception level. The UE 100 in an idle state may apply the priority of the inter-frequency cell reselection designated by the SIB5 to a cell (frequency) designated by the SIB18, when a plurality of D2D available cells (frequencies) are designated in the SIB18. For example, it is assumed that frequencies {F2, F4} are set in the descending order of priority in the SIB18, and frequencies {F4, F1, F2, F3} are set in the descending order of priority in the SIB5. In this case, frequency selection candidates of the UE that has interest in the D2D are {F2, F4}; however, SIB5 is succeeded for the order of priority, and thus, {F4, F2}.

The UE 100 in an idle state selects, when the frequency to which the D2D available cell belongs is different from the frequency at which the MBMS is provided, the frequency set to the highest priority on the basis of whether the UE 100 has an interest in either one of the D2D communication or the MBMS.

In a first modification of the embodiment, a method of setting either one of the D2D communication or the MBMS will be described.

In a first method, the UE 100 in an idle state always prioritizes the D2D communication out of the D2D communication and the MBMS. For example, when the frequency to which the D2D available cell belongs is different from the frequency at which the MBMS is provided, the frequency to which the D2D available cell belongs is set to the highest priority.

In a second method, the UE 100 in an idle state always prioritizes the MBMS out of the D2D communication and the MBMS. For example, when the frequency to which the D2D available cell belongs is different from the frequency at which the MBMS is provided, the frequency at which the MBMS is provided is set to the highest priority.

In a third method, the UE 100 in an idle state sets whether either one of the D2D communication or the MBMS is prioritized on the basis of information from an upper layer (for example, an application layer). For example, when the upper layer designates the D2D communication, the frequency to which the D2D available cell belongs is set to the highest priority. On the other hand, when the upper layer designates the MBMS, the frequency at which the MBMS is provided is set to the highest priority.

In a fourth method, the UE 100 in an idle state sets whether either one of the D2D communication or the MBMS is prioritized on the basis of an interested content of the D2D communication. For example, when the UE 100 has an interest in transmission in the D2D communication, the frequency to which the D2D available cell belongs is set to the highest priority. On the other hand, when the UE 100 has an interest in reception (or monitoring) in the D2D communication, the frequency at which the MBMS is provided is set to the highest priority.

It is noted that in the present modification, a case is excluded where the UE 100 has a plurality of receivers (for example, a dual receiver). However, when the UE 100 has a plurality of receivers, control may be performed such that the MBMS is set to a top priority in a first receiver and the D2D (Discovery) is set to a top priority in a second receiver.

[Second Modification]

In the above-described use case 3, the D2D interest notification includes information indicating a frequency for the D2D communication intended by the UE 100 and information indicating whether or not the UE 100 prioritizes the D2D communication over the cellular communication.

In a second modification of the embodiment, the D2D interest notification includes at least one of the information elements below. By the following information elements, the eNB 200 is capable of more appropriately performing control on the UE 100 from which the D2D interest notification is transmitted, for example.

Interested in/No Longer Interested in

This information element is set to either one of "Interested in" indicating that the UE 100 from which the D2D interest notification is transmitted has an interest in the D2D communication or "no longer interested in" indicating that the UE 100 is no longer interested in the D2D communication.

Discovery/Communication

As described above, the D2D communication includes the neighborhood discovery (Discovery) procedure. In this case, the D2D communication (transmission and reception of data) except for the Discovery is called Communication. This information element is set to either one of "Discovery" indicating an interest in the Discovery or "Communication" indicating an interest in Communication.

Announcing (Transmitting)/Monitoring (Receiving)

This information element is set to either one of "announcing (transmitting)" indicating an interest in transmission in D2D communication or "monitoring (receiving)" indicating an interest in reception (or monitoring)" in the D2D communication.

Inter-PLMN/Intra-PLMN

This information element is set to either one of "inter-PLMN" indicating an interest in D2D communication among different PLMNs (public mobile networks) or "intra-PLMN" indicating an interest in D2D communication within the same PLMN.

Inter-Frequency/Intra-Frequency

This information element is set to either one of "inter-frequency" indicating an interest in D2D communication between different frequencies or "intra-frequency" indicating an interest in D2D communication within the same frequency.

Inter-Cell/Intra-Cell

This information element is set to either one of "inter-cell" indicating an interest in D2D communication among different cells or "intra-cell" indicating an interest in D2D communication within the same cell.

Range Class (Short, Middle, Long)

This information element indicates a class within a signal reaching range in the D2D communication. For example, this information element is set to either one of three types including: "long" indicating a wide signal reaching range to almost reach a neighboring cell; "short" indicating a narrow signal reaching range to just reach within a serving cell; and "middle" indicating the middle of the two. It is noted that this information element may not be limited to such a three-level class; it may be specific values such as 50 m, 200 m, and 500 m and be IDs ("1"=50 m, "2"=100 m) corresponding thereto.

Frequency List

This information element is a list indicating one or more frequencies for the D2D communication intended by the UE 100.

[Third Modification]

In the above-described use case 3, the eNB 200 receiving the D2D interest notification (D2D unavailable cell) attempts handover of the UE 100 from the D2D unavailable cell to the D2D available cell.

However, as described in the above-described second modification, the D2D interest notification may indicate that the UE 100 is no longer interested in the D2D communication. Thus, the eNB 200 (D2D available cell) receiving the D2D interest notification indicating that the UE 100 is no longer interested in the D2D communication may attempt handover of the UE 100 from the D2D available cell to the D2D unavailable cell, on the basis of a load situation of the eNB 200. Thereby, it is possible to reduce a load of the D2D available cell.

[Fourth Modification]

The eNB 200 receiving the D2D interest notification from the UE 100 may perform control other than handover, on the basis of the received D2D interest notification.

DRX Configuration

A case is assumed where the UE 100 performs discontinuous reception (DRX), and during a period during which the UE 100 does not receive a downlink signal from the eNB 200 (OFF period), a D2D signal (in particular, a Discovery signal) is transmitted or monitored. It is possible to designate the DRX configuration from the eNB 200 to the UE 100.

In such a case, the UE 100 may transmit the D2D interest notification to the eNB 200 when a ratio of the OFF period falls below a threshold value. The ratio of the OFF period may be a ratio of the number of subframes that actually monitor the D2D signal, relative to the number of subframes available for monitoring the D2D signal. The threshold value may be designated by the eNB 200.

The eNB 200 receiving such a D2D interest notification changes a DRX parameter of the UE 100. For example, the eNB 200 changes the DRX parameter to increase the ratio of the OFF period while maintaining a DRX cycle. The DRX cycle consists of a set of an ON period and an OFF period. Alternatively, the eNB 200 may change the DRX cycle.

Discovery Monitoring Gap Configuration

A case is assumed where a Discovery monitoring gap that is a period during which the Discovery signal should be monitored is designated to the UE 100 by the eNB 200.

In such a case, the UE 100 may transmit the D2D interest notification to the eNB 200 upon determination that a Discovery monitoring gap is insufficient. The eNB 200 receiving such a D2D interest notification changes a Discovery monitoring gap parameter of the UE 100. For example, the eNB 200 changes the Discovery monitoring gap parameter to lengthen the Discovery monitoring gap.

[Other Embodiments]

In the above-described embodiment, an example where the D2D availability notification is transmitted by broadcast is described; however, it may be transmitted by unicast.

The following operation may be introduced to the above-described use cases. Specifically, the UE 100 in a connected state in the D2D available cell may transmit the D2D interest notification to said cell. As a result, the D2D available cell receiving the D2D interest notification may be capable of keeping the UE 100 that has notified of the D2D interest notification within the cell as much as possible, or capable of determining the handover destination in consideration of the D2D interest notification, and thus, it is possible to increase continuation of the D2D communication of the UE 100.

Further, in the above embodiment, as one example of a mobile communication system, the LTE system is explained. However, the present disclosure is not limited to the LTE system, and the present disclosure may be applied to systems other than the LTE system.

[Additional Statement]

[1] Introduction

Agreements

- supporting Inter-Frequency and Inter-PLMN discovery for monitoring UEs.
- eNB may provide in SIB a list of (intra-PLMN-inter-frequency and/or inter-PLMN-inter-frequency) carriers (possibly with the corresponding PLMN ID) on which the UE may aim to receive ProSe discovery signals.
- A cell does not provide detailed ProSe configuration (SIB18) for other carriers. If a UE wants to receive ProSe discovery signals on another carrier, it needs to read SIB18 (and other relevant SIB) from there.
- FFS whether (as a configuration) option eNB may provide detailed ProSe Discovery information about other intra-PLMN carriers.
- FFS whether the list of other ProSe carriers could alternatively be provided by higher layers for inter-PLMN carriers.
- UEs transmit ProSe discovery signals only on their serving cell (if authorized by the NW).
- Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps.
- If the UE has to obtain ProSe discovery (2a) configuration from the SIB of an inter-frequency cell, this does not affect the UE's Uu reception on the serving cell(s).
- An RRC CONNECTED UE interested (or no longer interested) in intra- or inter frequency ProSe discovery reception indicates this by sending a "ProSe indication" to the eNB (further restrictions to be discussed).

In this additional statement, the remaining issues to support inter-frequency and inter-PLMN discovery are discussed along with possible solutions.

[2] Remaining Issues in Inter-PLMN Discovery Aspect

In this section, we discusses on inter-frequency/inter-PLMN discovery.

(2.1) FFS on Whether Higher Layer Provides Inter-PLMN Carrier List

It was captured that FFS whether the list of other ProSe carriers could alternatively be provided by higher layers for inter-PLMN carriers, which may be useful for the UE in case where the serving cell cannot provide SIB18 for some reason. However, to inherit the existing concept, we assume RAN (Radio Access Network) itself should have a responsibility to decide operating frequencies of own cells and to determine which carrier supports discovery. In addition, the higher layer, i.e. ProSe Function, cannot provide the list of carriers for ProSe discovery at this point, i.e. it may only provide the radio parameters to be used for ProSe direct communication when not served by E-UTRAN. So, to introduce such higher layer signallings will need to introduce additional interfaces between RAN and ProSe Function. Therefore, we propose that at least Rel-12 should not support the list of other carriers for inter-PLMN ProSe discovery provided by higher layers.

Proposal 1: At least in Rel-12 RAN2 should assume only RAN provides the list of inter-PLMN frequencies which support ProSe discovery.

Figure 10:
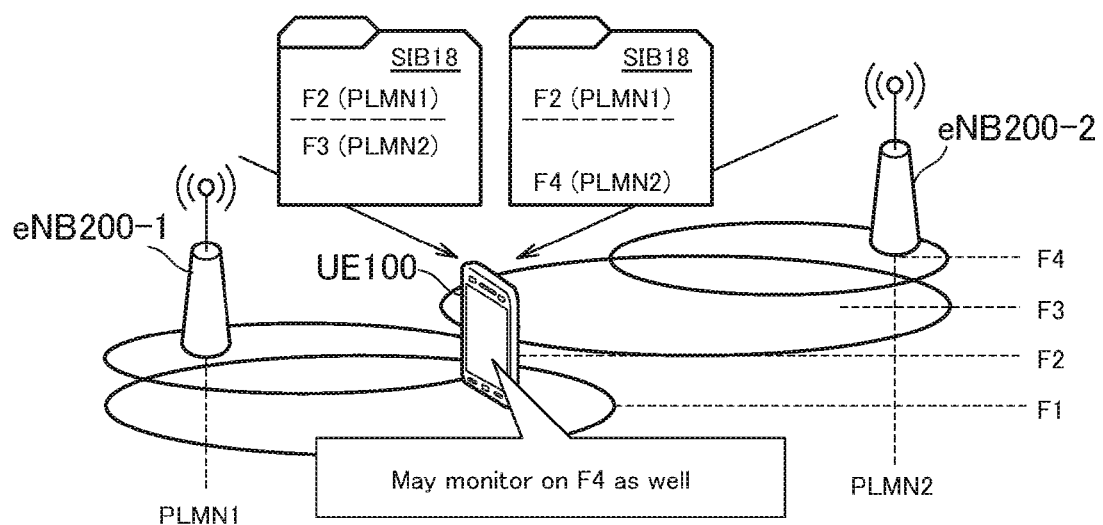
FIG. 10 is a diagram illustrating one example of operation environment according to other embodiments.

(2.2) Further Clarifications of Current Agreements (2.2.1) UE Behaviour Upon Reception of the List of ProSe Discovery Carriers An eNB may provide in SIB a list of carriers on which the UE may aim to receive ProSe discovery signals. This sounds like the list is either restriction or assistance for the UE or both. Since the monitoring of inter-PLMN discovery signals will be performed after the existing PLMN selection procedure, we need to define the UE behaviour upon reception of the list more clearly. We see it's preferable the list is just for assistance information for the monitoring UE to reduce unnecessary power consumption, i.e. the UE may or may not monitor only ProSe discovery signals transmitted on the carriers provided in the list. It intends, for example, if the UE notices additional ProSe carriers in the list in the other PLMN's SIB18 (i.e. PLMN 2), where the additional ProSe carriers were not listed in the serving cell's SIB18 (i.e. PLMN 1), then the UE may monitor discovery signals transmitted on the additional ProSe carriers, as figured in FIG. 10. Furthermore, it could additionally be considered that the UE may further decide whether to monitor discovery over yet another PLMN (i.e. PLMN 3 not illustrated in FIG. 10) regardless whether the frequency is listed in SIB18 received from PLMN 1 or PLMN 2, as long as the UE has authorization to do so over higher layer and no impact on Uu reception.

Proposal 2: The UE is not required from the serving cell to tune onto carriers other than the ProSe carriers listed in SIB18 but it should not be any restriction for discovery monitoring.

(2.2.2) Clarification on "ProSe Reception does not Affect Uu Reception"

The agreement stated that ProSe reception does not affect Uu reception (e.g. UEs use DRX occasions in IDLE and CONNECTED to perform ProSe discovery reception or it uses a second RX chain if available). The main intention of this agreement was for the UE to avoid the use of autonomous gap for ProSe discovery. This means the eNB-configured gap is not considered as affecting Uu reception, which is based on the existing mechanism for measurement gap procedure.

Confirmation 1: An explicit eNB-configured gap is not considered as affecting Uu reception.

ProSe discovery using only DRX occasion may result in degradations of discovery probability, i.e. best-effort discovery. Although a UE capable of dual Rx chains has additional benefits, RAN1 currently assumes a single receiver for discovery. Furthermore, it is assumed that non-public safety UE may not be able to receive simultaneously on the DL and UL spectrum of FDD carriers supporting D2D.

Observation 1: If only DRX occasions are used, discovery opportunities may be severely limited.

Considering the potential degradation in using only DRX occasions, the discovery occasions should be based on the existing gap mechanism. However, in order for the gap mechanism to work for discovery, the serving cell should have knowledge of detailed ProSe discovery information about the other inter-PLMN carriers in order to configure the UE, which is interested in discovery monitoring, with appropriate parameters. Since it was agreed that the UE should read SIB18 of the other inter-PLMN carriers to monitor discovery signals transmitted on such carrier, it would be assumed that the UE should have a capability to inform the serving cell of the information which the UE has already obtained. If the serving cell doesn't have any information of detailed ProSe discovery configuration among concerned PLMNs, i.e. no NW-level coordination (i.e. inter-OAM or inter-RAN detailed discovery information sharing) is provided, the following two options could be considered for the serving cell to obtain the information before it decides whether to configure gaps for the UE:

Option 1: The UE forwards the full or subset of SIB18 which is received from inter-PLMN cells to the serving cell. It is FFS when the UE should send inter-PLMN SIB18 information to the serving cell.

Option 2: The UE informs the serving cell of the possible gap occasions, e.g. a gap pattern, which the UE has determined based on SIB18 received from inter-PLMN cells. It's similar to the solution approach for in-device co-existence.

From the signalling overhead perspective, Option 2 is more preferable than the Option 1 since Option 1 may require that the UE forwards multiple SIB18s to the serving cell. In comparison, Option 2 only requires that the UE informs the serving cell of the desired gap pattern. It is FFS whether the serving cell could indicate whether inter-PLMN coordination among NWs can be assumed or whether the NW can decide if UE assistance is needed for inter-PLMN discovery.

Proposal 3: The serving cell should configure the UE with gaps for inter-PLMN discovery monitoring, which may be based on a gap pattern requested by the UE.

[3] Remaining Issues in Inter-Frequency Discovery Aspect

In this section, we discuss on inter-frequency/intra-PLMN discovery.

(3.1) FFS on Whether (as a Configuration) Option an eNB May Provide Detailed ProSe Discovery Information about Other Intra-PLMN Carriers.

In contrast to inter-PLMN discovery, with intra-PLMN discovery, it may be assumed that the serving cell has knowledge of the detailed ProSe Discovery information of its neighbour cells regardless of whether the serving cell provides the information directly to the UE.

This FFS suggests that the serving cell may provide not only its SIB18 information but also detailed ProSe Discovery information of other intra-PLMN frequencies. In our view, the significance of this FFS is not so much whether the serving cell would provide ProSe discovery information of inter-frequency cells to UEs, but that the serving cells actually has coordination with inter-frequency cells. With only the latter information, it would be possible for the serving cell to configure appropriate gaps for the UE for inter-frequency ProSe discovery without providing detailed information.

Table 1 provides a comparison for the two cases, 1) UE obtain SIB18 directly from other carriers (baseline), 2) UE obtains SIB18 information only from its serving cell (FFS). While both schemes have drawbacks, the FFS scheme (case 2) has benefits to reduce UE complexity and to allow network-configurable operations. The baseline scheme (case 1) depends on the existing DRX mechanism; therefore, even if the UE obtains the SIB18 from the other carriers directly, the information isn't of much use to the UE if the discovery occasions are very limited. Therefore, we propose as a configuration option that an eNB has a capability to provide detailed ProSe Discovery information about other intra-PLMN frequencies.

TABLE 1

| | Item | UE obtains SIB18 directly from other carriers (case 1: baseline) | UE obtains SIB18 only from serving cell (case 2: FFS) |
|---|---|---|---|
| Network complexity | Signalling overhead per carrier (on SIB or dedicated signalling) | 1 × (SIB18) ☺ | < (# of frequencies) × (SIB18) ☻ |
| | Monitoring occasion | Up to UE (so far) ☺ | Serving cell assigned gaps ☻ (assuming inter-eNB coordination of ProSe configurations.) |
| | OAM configuration | (# of cells) ☺ | (# of cells) × (# of frequencies) ☻ |
| UE complexity | SIB decoding | (# of frequencies) ☻ | 1 [only serving cell] ☺ |
| | Monitoring occasion | UE-based decision ☻ (e.g. DRX occasion) UE may inform gap patterns ☻ | Serving cell assigned gaps ☺ |
| Comparison | Benefits ☺ | Lighter signalling Low complex network. Smaller OAM efforts. | UE complexity is reduced. Network-configurable occasion i.e. gap, to ensure discovery performance. |
| | Drawbacks ☻ | UE complexity, which should decode SIBs on each carrier and may decide when it tunes to which carriers. | Heavier signalling load. Network complexity, which needs management of gaps. Bigger OAM efforts on parameter setting for SIB18s. |

Proposal 4: as a configuration option, an eNB may provide detailed ProSe Discovery information about other intra-PLMN carriers via SIB and/or dedicated signalling.

Even if the proposal 4 is not agreeable, an alternative scheme is available to be discussed. As shown in Table 1, the network-configurable discovery occasion is beneficial to ensure the discovery performances as well as to reduce UE complexity. It may be assumed that the serving may obtain the SIB18 information of inter-frequency, neighbour cells through OAM With this alternative, the UE does not need to inform the serving cell of full or a subset of SIB18s on other carriers as well as the serving cell does not provide full contents of SIB18 on other intra-PLMN frequencies, but it has a capability to configure the UE with gaps for discovery monitoring. Since the drawback (signalling load) can be removed, this alternative scheme could become a compromise solution.

Proposal 5: Even if it is not agreeable for the serving cell to provide detailed ProSe discovery information to the UE, the serving cell should configure the UE with appropriate gaps for discovery monitoring.

Figure 11:
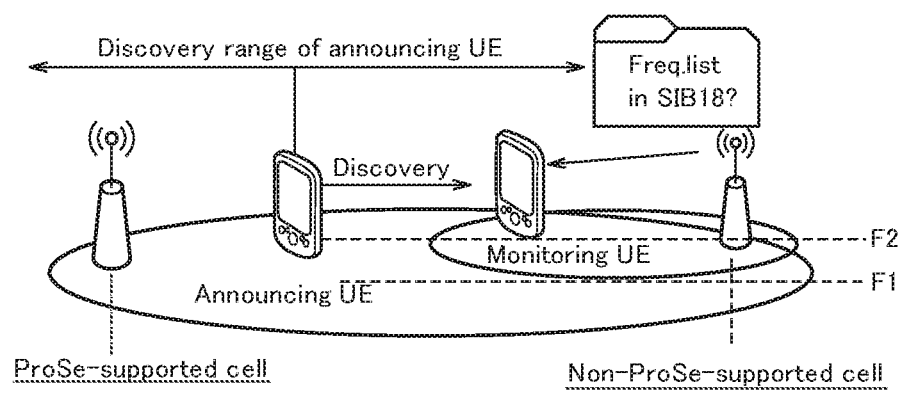
FIG. 11 is a diagram illustrating a case of a monitoring UE that camps on ProSe non-support cell.

(3.2) Further Clarifications of Current Agreements (3.2.1) Whether the Serving Cell not Supporting ProSe Discovery on its Carrier can Provide the List of Other ProSe Carrier An eNB may provide in SIB a list of (intra-PLMN-inter-frequency and/or inter-PLMN-inter-frequency) carriers (possibly with the corresponding PLMN ID) on which the UE may aim to receive ProSe discovery signals, it should be clarified whether the serving cell not supporting ProSe discovery on its carrier can provide the list of other ProSe carrier, as depicted in FIG. 11.

FIG. 11 shows an example where the monitoring UE camped on the serving cell which does not support ProSe discovery wants to know the list of carriers which support ProSe discovery. If the serving cell provides the list of carriers in its SIB, the behaviour of the monitoring UE is the same as the agreed inter-frequency discovery.

Proposal 6 : The serving cell which does not support ProSe discovery on its carrier should also provide in SIB the list of other ProSe carrier (and detailed ProSe discovery information if the Proposal 4 is agreeable).

(3.2.2) NW Behaviour Upon Reception of ProSe Indication

It was agreed that for both ProSe discovery and communication the UE sends ProSe Indication to inform the serving cell of its intention for discovery. For ProSe communication, it was captured that the eNB behaviour upon reception of the ProSe Indication includes the options for handover to move the UE towards the carrier which supports ProSe communication. However, for ProSe discovery the NW behaviour upon reception of the ProSe indication is still unclear; therefore, the UE behaviour is also not clear, e.g. what triggers the UE to transmit ProSe Indication.

Proposal 7: it should be discussed the NW's expected behaviour upon reception of the ProSe Indication for discovery.

Some of the candidate NW behaviours are as follows:

A) Handover; for the purpose of load balancing, the eNB may move the UE to appropriate carrier depending on whether the UE indicates "interested" or "no longer interested" within the ProSe Indication message for discovery.

B) ProSe discovery configuration change; to assign suitable occasion for discovery monitoring, the eNB may reconfigure the UE with either updated DRX parameters or gaps (if proposal 3, 4 or 5 is acceptable), upon reception of the ProSe Indication that the UE is interested in inter-frequency discovery.

Note that the other aspect for reception of intra-frequency interests is discussed.

Observation 2: Upon reception of ProSe indication for discovery, the serving cell has the option to perform handover and/or change the UE's DRX configuration to assist with discovery monitoring.

(3.2.3) ProSe Indication Details (3.2.3.1) Frequency Information

Although it was not discussed for discovery, the ProSe Indication for communication was agreed to include the intended ProSe frequency to support the ProSe communication involving transmission and reception. For discovery purpose, it will be also beneficial to include the intended frequencies in the ProSe Indication. For example, if the UE indicated that the frequency of interest is the serving frequency then handover will likely not be needed.

And if the UE indicated its frequency of interest is a different frequency then it may be necessary for the serving cell to handover the UE to the indicated frequency or at least provide the UE with gaps for monitoring discovery on that frequency. Although the UE may not have any preferences which frequency it's interested in, there are some possibilities in the future whereby an application-specific frequency is indicated in the higher layer or UE has history information regarding discovery on a particular frequency(ies). For example, if the serving cell configured gaps for the UE on a particular frequency and the UE was able to receive the discovery signal of interest on this frequency, it would be helpful if the UE indicates this frequency to the serving cell in case the serving cell subsequently configures gaps for a different frequency of no interest to the UE.

In case the frequency of interest is the serving frequency, it's FFS how the UE would indicate the interest for intra-frequency discovery monitoring, e.g. whether the UE just indicate the serving frequency as the indicated frequency.

Proposal 8: it should be agreed to allow the UE to include a list of frequencies of interest in the ProSe Indication.

Although it's still FFS whether the ProSe Indication for discovery can also inform of interests for inter-PLMN discovery, the list of frequency in the proposal 8 may be used to distinguish such case by means of, e.g. the serving cell compares the list of frequency in the ProSe Indication and the list of frequency in its own SIB. If the proposal 3 to obtain information to configure gap is acceptable, the serving cell should perform appropriate actions for it upon reception of the ProSe Indicaiton which implies inter-PLMN discovery monitoring.

Proposal 9: it should be agreed to allow the ProSe Indication to inform of intention for inter-PLMN discovery reception in addition to intra- or inter-frequency discovery.

(3.2.3.2) Independent or Integrated with UEAssistanceInformation

For a similar functionality with the ProSe Indication, it has been agreed that, as baseline, re-use the UEAssistanceInformation message for requesting ProSe discovery resources, which was essentially assumed only for a request of transmission resources for Type 2B discovery (i.e. a procedure in which resources for announcing discovery signal are allocated to each UE individually). Therefore, the issue is whether the ProSe Indication should be integrated with the baseline agreement. The functions are listed in Table 2.

TABLE 2

| | | UEAssistanceInformation | ProSe Indication for discovery |
|---|---|---|---|
| Intra-frequency Intention May include inter-cell | Discovery Announcing | Can intend (as request for dedicated resources) | No (yes, if proposal 11 is acceptable) |
| | Discovery Monitoring | No | Yes |
| | Communication Transmission & reception | No | Yes (not restricted to intra-freq.) |
| Inter-frequency Intention May include inter-PLMN | Discovery | No | Yes, without intended freq. (With intended freq., if proposal 8 is acceptable) |
| | Communication Intended frequency | No | Yes |
| Expected eNB behaviour | Discovery | Type 2B transmission resource allocation | May RRM measurement configuration May handover (observation 2) May discovery Configuration change (observation 2) |
| | Communication | None | RRM measurement configuration Handover RRC Connection Release |

In comparison, the UEAssistanceInformation was intended for simply request the transmission resource in intra-frequency operation, while the ProSe Indication may have much functionality involving inter-frequency operations. However, no reason can be seen to have two independent messages for similar functionality, unless the eNB and/or UE behaviours are conflicted. Although such confliction may occur when the ProSe Indication indicates interest in intra-frequency discovery announcing if the proposal 11 is acceptable, it can be distinguished by what type of serving cell receives the indication, i.e. either a ProSe-supported cell allocates Type 2B resource or a non-ProSe supported cell may initiate handover. Therefore, to merge both messages into one message is preferable, and if it's acceptable, a new message for the ProSe Indication should be introduced.

Proposal 10: A single RRC message for the ProSe Indication should be introduced with merging the existing function assigned to the UEAssistanceInfomation as a baseline.

(3.2.3.3) Announcing Intention

The ProSe Indication for discovery was agreed to inform of the intention for monitoring. In case where the UE wants to perform discovery announcing (transmission) but is now connected to non-ProSe supported cell (see FIG. 11), it should be considered how to deal with such dead-lock condition for the UE. A possible solution may be to inform the serving cell of the announcing intention in the ProSe Indication, wherein the UE expects the serving cell to perform handover to a ProSe-supported carrier. With this information, the serving cell could for example decide whether it is necessary to handover the UE to a ProSe supported cell. In case the UE has dual receivers and doesn't have intention for discovery announcing, it may suitable to handover the UE to a non-ProSe supported cell (perhaps one that is less congested) and allow the UE to use its 2nd receiver for discovery monitoring.

Proposal 11: The UE should inform the serving cell of the intention for discovery announcing.

(3.2.4) Priority Handling in RRC IDLE

Before the discussion on priority handling in RRC IDLE UEs, it should be clarified how to support inter-frequency discovery. In MBMS case, the UE to attempt the MBMS reception should camp on the cell which provides an MBMS service the UE is interested in, as long as the UE has a single receiver. On the other hand, the discovery monitoring seems not to be required camping on the cell which supports ProSe discovery, i.e. "Intra- and inter-frequency (and inter-PLMN) ProSe reception does not affect Uu reception (e.g. UEs use DRX occasions in IDLE and CONNECTED to perform ProSe discovery reception or it uses a second RX chain if available). The UE shall not create autonomous gaps." This is likely a similar approach to CRS reception in the existing inter-frequency measurement. However, it's still not clear whether the UE is required to camp on that cell for inter-frequency discovery monitoring.

Figure 12:
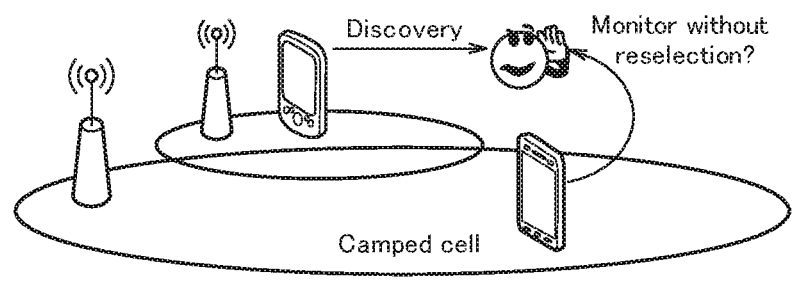
FIG. 12 is a diagram illustrating a discovery monitor without a cell reselection.

Confirmation 2: The UE which attempts inter-frequency (and inter-PLMN) discovery monitoring is not required to camp on the cell which supports ProSe discovery (see FIG. 12).

As discussed in section 3.2.2, the load balancing among inter-frequency cells including non-ProSe supported cells may be optimized using handovers with the ProSe Indication depending on whether the UEs in RRC CONNECTED are interested in ProSe discovery. However, it isn't clear whether there is any need for modifying the existing reselection procedure and priority to accommodate UE's interested in discovery monitoring. In particular, any changes to the reselection procedure and priority should be carefully considered considering the issue with idle mode load balancing that is specifically configured for UEs through Cell-ReselectionPriority provided in SIB5 or by dedicated signalling.

At least for UEs no longer interested in ProSe discovery, the UEs should follow the existing reselection priority configured by the eNB.

Observation 3: IDLE UEs no longer interested in ProSe discovery shall follow the existing rules for cell reselection priority.

Then, it should be further considered whether the UE in IDLE is allowed to prioritize ProSe discovery over the existing cell reselection procedure when the UE is interested in ProSe discovery. If the inter-frequency cell is not synchronized with the serving cell, it should be considered whether the existing DRX occasions is sufficient for discovery monitoring on another frequency. Additionally if the UE interested in ProSe discovery monitoring also tends to be interested in ProSe discovery announcing, it may be better that the UE camps on a cell operated on a carrier listed in SIB18 because it can avoid to perform reselection before transmitting discovery signals. However, if the UE is only interested in discovery monitoring, there seems to be no overriding reason to prioritize the carrier listed in SIB18 during cell reselection. Therefore, whether or not the prioritization of the ProSe carrier is needed depends on the assumption for the UE being interested in ProSe discovery monitoring.

Proposal 12: UE being interested in ProSe discovery should be allowed to prioritize for ProSe discovery during cell reselection.

[4] Conclusion

In this additional statement, the remaining issues for support of inter-frequency and inter-PLMN discovery are discussed and the clarifications on current agreements are provided. The necessary extensions for the discovery monitoring procedure and the ProSe Indication are addressed. Additionally, the consideration on the existing cell reselection procedure is provided.

Clearly, other modifications and manners of practicing this invention will occur readily to those of ordinary skill in the art in view of these teachings. The above description is illustrative and not restrictive. This invention is to be limited only by the following claims, which include all such modifications and manners of practice when viewed in conjunction with the above specification and accompanying drawings. The scope of the invention should, therefore, be determined not with reference to the above description, but instead should be determined with reference to the appended claims along with their full scope of equivalents.

INDUSTRIAL APPLICABILITY

The present disclosure is useful for radio communication fields such as mobile communications.

The invention claimed is:
1. A user terminal, comprising:
a controller including a processor, wherein in the case that the user terminal is in a Radio Resource Control (RRC) idle mode, the controller is configured to:
camp on a first cell on a non-public safety frequency which is unavailable for Device-to-Device (D2D) communication;
find a second cell on a public safety frequency which is available for the D2D communication, in response to the user terminal attempting to start the D2D communication using the public safety frequency;
autonomously set the public safety frequency as a highest priority frequency of cell reselection in response to the user terminal attempting to start the D2D communication using the public safety frequency;
reselect and camp on the second cell in response to setting the public safety frequency as the highest priority frequency; and
use the public safety frequency to perform the D2D communication while camping on the second cell on the public safety frequency.

* * * * *